United States Patent [19]

Gundlach

[11] Patent Number: 5,560,766

[45] Date of Patent: Oct. 1, 1996

[54] THERMAL INK JET COMPOSITION

[75] Inventor: Kurt B. Gundlach, Pittsford, N.Y.

[73] Assignee: Xerox Corporation, Stamford, Conn.

[21] Appl. No.: 475,445

[22] Filed: Jun. 7, 1995

[51] Int. Cl.$^6$ .................................................. C09D 11/02
[52] U.S. Cl. ..................... 106/22 R; 106/22 K; 106/20 D
[58] Field of Search .............................. 106/22 R, 22 K, 106/20 D

[56] References Cited

U.S. PATENT DOCUMENTS

| | | | |
|---|---|---|---|
| 4,026,713 | 5/1977 | Sambucetti et al. | 106/20 B |
| 4,400,216 | 8/1983 | Arora | 524/589 |
| 4,505,749 | 3/1985 | Kanekiyo et al. | 106/22 R |
| 4,508,570 | 4/1985 | Fujii et al. | 106/22 R |
| 4,601,756 | 7/1986 | Chiba et al. | 106/22 R |
| 4,623,689 | 11/1986 | Shintani et al. | 524/457 |
| 4,627,876 | 12/1986 | Fries et al. | 106/27 R |
| 4,914,562 | 4/1990 | Abe et al. | 346/140 R |
| 5,019,166 | 5/1991 | Schwarz | 106/22 R |
| 5,108,504 | 4/1992 | Johnson et al. | 106/25 A |
| 5,116,409 | 5/1992 | Moffatt | 106/22 R |
| 5,118,350 | 6/1992 | Prasad | 106/22 R |
| 5,143,547 | 9/1992 | Kappele | 106/22 R |
| 5,145,519 | 9/1992 | Kappele | 106/22 R |
| 5,185,034 | 2/1993 | Webb et al. | 106/22 R |
| 5,196,057 | 3/1993 | Escano et al. | 106/22 R |
| 5,207,824 | 5/1993 | Moffatt et al. | 106/22 R |
| 5,254,159 | 10/1993 | Gundlach et al. | 106/22 H |
| 5,273,573 | 12/1993 | Kappele | 106/22 R |
| 5,382,283 | 1/1995 | Yui et al. | 106/22 R |
| 5,395,434 | 3/1995 | Tochihara et al. | 106/22 R |
| 5,476,541 | 12/1995 | Tochihara | 106/22 R |

*Primary Examiner*—Helene Klemanski
*Attorney, Agent, or Firm*—Oliff & Berridge

[57] ABSTRACT

An ink jet composition contains an acid dye or reactive dye and a direct dye.

17 Claims, No Drawings

THERMAL INK JET COMPOSITION

BACKGROUND OF THE INVENTION

The invention relates to a thermal ink jet composition comprising a combination of dyes. The combination permits color "tuning" and provides aesthetically pleasing colors.

U.S. Pat. No. 5,118,350 to Prasad discloses a set of dyes comprising hydrolyzed-Reactive Red 180, Acid Red 52, Acid Yellow 23 and Acid Blue 9. U.S. Pat. No. 5,143,547 to Kappele discloses a dye set comprising Acid Yellow 23, Direct Red 227 and Acid Blue 9. U.S. Pat. No. 5,145,519 to Kappele discloses a dye set comprising Direct Yellow 86, Acid Red 52 and Acid Blue 9. U.S. Pat. No. 5,273,573 to Kappele discloses a dye set comprising Acid Yellow 23, Acid Red 52 and Acid Blue 9.

SUMMARY OF THE INVENTION

The present invention relates to a thermal ink jet composition comprising (a) a liquid medium and (b) a colorant package comprising (i) an acid dye and a direct dye or (ii) a reactive dye and a direct dye. For example, the invention relates to a fast dry thermal ink jet composition comprising a mixture of Acid Yellow 17 and Direct Yellow 132 that very closely mimics vibrancy and hue of well known warm yellow colorations. Additionally, by adjusting the proportions of Acid Yellow 17 and Direct Yellow 132, coloration of the resulting printing can be adjusted to mimic a wide variety of other known yellow hues.

The invention also relates to a set of thermal ink jet inks comprising a yellow ink, containing a yellow dye package, a magenta ink containing a magenta dye package and a cyan ink containing a cyan dye package for thermal ink jet printers. Each dye package can comprise (i) an acid dye and a direct dye or (ii) a reactive dye and a direct dye.

The invention also relates to a process of thermal ink jet printing, comprising causing a thermal ink jet composition, comprising (a) a liquid medium and (b) a colorant package comprising (i) an acid dye and a direct dye or (ii) a reactive dye and a direct dye to be ejected in an imagewise fashion from a thermal ink jet printer onto a substrate.

DETAILED DESCRIPTION OF PREFERRED EMBODIMENTS

Inks of the present invention comprise (a) a liquid medium and (b) a colorant package comprising an acid dye and a direct dye or a reactive dye and a direct dye.

Additionally, the invention relates to a set of thermal ink jet inks comprising a yellow ink containing a yellow dye package, a magenta ink containing a magenta dye package and a cyan ink containing a cyan dye package for thermal ink jet printers, at least one of the dye packages comprising an acid dye and a direct dye or a reactive dye and a direct dye.

The acid dyes and reactive dyes are known as brilliant dyes and have high tincture strength. Direct dyes have broader adsorption bands with lower tincture. The direct dyes appear duller and are not as brilliant as corresponding acid and reactive dyes. Generally, the acid dyes are more soluble in a water solvent system of a thermal ink jet composition and result in a printed product that fades more quickly than a direct dye colored product.

Unexpectedly, a dye of the invention, for example a dye comprising Acid Yellow 17 and Direct Yellow 132 provides a quick dry thermal ink jet composition characterized by excellent qualities of both acid dye or reactive dye and direct dye, i.e., excellent brilliance and excellent light fastness and water fastness. Additionally, a mixture of an acid dye and a direct dye can be adjusted in proportion, i.e., "fine tuned", to mimic the vibrancy and hue of many attractive natural and artificial colors.

Additionally, the present invention relates to a black dye package. Certain black dyes such as Basacid X34 (BASF) and Special Black HF (Miles) when used as the sole colorant appear greenish and aesthetically unpleasing when printed on alkaline sized plain papers. According to the present invention a black dye package can be formulated that appears neutral to the human eye across a large set of plain office papers. The black dye package according to the present invention comprises (a) a liquid medium and (b) a colorant package comprising a member selected from the group consisting of Basacid, H34 and Special Black HF and a member selected from the group consisting of Direct Red 227 Na sodium salt and Acid Red 52 dye solids. The black dye package may comprise 1.0 to 6.0 wt. % of the member selected from the group consisting of Basacid X34 and Special Black HF, 0.1 to 1.0 wt. % of a member selected from the group consisting of Direct Red 227 Na salt and Acid Red 52 dye solids and 99.8. to 93.0 wt. % liquid medium.

Examples of suitable dyes in the invention include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Direct Brilliant Pink B (Crompton-Knolls) and Luxol Blue MBSN (Morton-Thiokol). Typical preferred dyes include Acid Yellow 17, Direct Yellow 132, Direct Blue 199, Acid Blue 9, Projet Magenta 1T Solids, (a reactive dye) Acid Red 52, Basacid X-34 (BASF), Special Black HF (Miles), Direct Red 227 Na salt and Acid Red 52 dye solids.

For example, a mixture of 1.5 weight percent Acid yellow 17 and 1.5 weight percent Direct Yellow 132 (warm yellow, Projet Yellow 1G) very closely mimics the vibrancy and hue to the human eye of 3 weight percent Acid Yellow 23 (Tartrazine) when placed in a fast dry ink (dry time on "plain" paper less than 1 second). The mixed dye ink demonstrates improved light and water fastness relative to Acid Yellow 23.

A mixture of 1.5 weight percent Direct Blue 199 and 1.5 weight percent Acid Blue 9 closely mimics the optical density and hue of a fast dry ink with 3.5 weight percent Direct Blue 199 at less cost and superior latency in thermal ink jet hardware. The mixture closely mimics the optical density and hue of a fast dry ink with 2.5 weight percent Acid Blue 9 but has superior light fastness.

A mixture of 2.5 weight percent of Projet Magenta 1T solids (ICI) and 0.6 weight percent Acid Red 52 closely mimics the optical density and hue of the 2.25% hydrolyzed-Reactive Red 180 and 0.6 weight percent Acid Red 52. Another more expensive and improved light fast mixture that also mimics the Reactive Red 180/Acid Red 52 chromophore mixture comes from mixing 2.5 weight percent of Mitsubishi Magenta solids and 0.6 weight percent of Acid Red 52.

When Basacid X-34 (BASF) or Special Black HF (Miles) are utilized as sole colorant prints on alkaline sized "plain" papers, the print appears greenish and aesthetically unpleasing. Mixing 5.5 weight percent dye solids of either X-34 or Special Black HF with 0.5 weight percent Direct Red 227 Na salt provides a fast dry ink that appears neutral to the human eye across a large set of "plain" office papers. Another dye mixture with improved neutral black chroma on "plain" papers is derived from 5.5 weight percent X-34 or Special Black HF dye solids and 0.3 weight percent Acid Red 52 dye solids. Aesthetically pleasing slow dry black inks can be formulated with 3.5 weight percent X-34 or Special Black HF dye solids mixed with either 0.3 weight percent Direct Red 227 Na salt or 0.2 weight percent Acid Red 52 dye solids.

Preferred inks may comprise 0.1 to 3.5 wt. % Acid Yellow 17, 0.1 to 4 wt. % Direct Yellow 132 and 99,8 to 92.5 wt. % liquid medium, 0.1 to 3.5 wt. % Projet Magenta 1T solids, 0.1 to 3 wt. % Acid Red 52 and 99.8 to 93.5 wt. % liquid medium or 0.1 to 4 wt. % Direct Blue 199, 0.1 to 3.5 wt. % Acid Blue 9 and 99.8 to 92.5 wt. % liquid medium.

The dye package is generally present in the ink composition in an effective amount, generally from about 0.2 to about 8 percent by weight, and preferably from about 1 to about 6 percent by weight. The proportion of acid dye or reactive dye to direct dye in the colorant package can range from 10:1 to 1:10, preferably between 5:1 and 1:5 and most preferably between 2:1 and 1:2.

The inks of the present invention also include a liquid medium. Frequently, water comprises the major portion of the liquid medium and, while it may comprise 100 percent of the liquid medium, water is generally present in an amount of from about 7 to about 93 percent by weight of the ink, and preferably from about 55 to about 85 percent by weight of the ink.

Preferably, the inks of the present invention also contain a humectant such as a glycol, including ethylene glycol, propylene glycol, other glycols, or other known humectants as part of the liquid medium. When present, the humectant is present in an effective amount, generally from about 5 to about 60 percent by weight, preferably from about 10 to about 20 percent by weight, and most preferably at about 17 percent by weight. Any other suitable liquid medium can also be employed provided that the objectives of the present invention are achieved.

Optionally, the ink composition can include a biocide such as sorbic acid, 1-(3-chloroally)-3,5,7triaza-1-azoniaadamantane chloride, commercially available as Dowicil 200 (Dow Chemical Company, Midland, Mich.), vinylene-bis thiocyanate, commercially available as Dowicil 200 (Dow Chemical Company, Midland, Mich.), vinylene-bis thiocyanate, commercially available as Cytox 3711 (American Cyanamid Company, Wayne, N.J.), disodium ethylenebisdithiocarbamate, commercially available as Dithone D14 (Rohm & Haas Company, Philadelphia, Pa.), bis-(trichloromethyl) sulfone, commercially available as Biocide N-1386 (Stauffer Chemical Company, Westport, Conn.), zinc pyridimethione, commercially available as zinc omadine (Olin Corporation Stamford, Conn.), 2-bromotnitropropane-1,3-diol, commercially available as onyxide 500 (Onyx Chemical Company, Jersey City, N.J.), Bosquat MB50 (Louza, Inc., Fairtown, N.J.) and the like may be present in the inks of the present invention. When present the biocide is in an effective amount, generally from about 0.01 to about 1 percent by weight, and preferably from about 0.1 to about 0.5 percent by weight.

The ink compositions in the invention can include a surfactant. The surfactant may be present in an effective amount, usually from about 0.1 to about 8% by weight of the ink, and preferably from about 0.2 to 6% by weight of the ink. The surfactants may be selected from the group consisting of polyoxyalkylated ethers, anionic bitail fluoro alkyls, alkyl aryl sulfonates, alkyl diamine quaternary salts, and mixtures thereof. A suitable surfactant is of the formula $H_{35}C_{18}O(CH_2CH_2O)_{20}H$, and is commercially available as Peregal 'O' from GAF Corporation, Wayne, N.J. Other members of this class of surfactants include ethoxylates of secondary alcohols having chain lengths of from about 11 to about 15 carbon atoms, such as those commercially available as the Tergitol® series from Union Carbide, Danbury, Conn. Also in this class of surfactants are the Emulphogene® series available from GAF, including polyoxyethylated tridecyl alcohols, polyethoxylated decyl alcohol, polyoxyethylated alkyl thioether, linear aliphatic ethoxylates, polyoxyethylated castor oil, polyoxyethylated coconut fatty acid, polyoxyethylated oleyl alcohol, and the like. Inks including polyoxalkylated ether surfactants exhibit reduced heater deposits, suppressed nozzle crusting, and better mixing of inks of different colors. Improved color mixing enables bidirectional printing, wherein the colors are laid down in a different order, depending on whether printing occurs from right to left or from left to right; with ideal color mixing, the print color will not be affected by the direction of printing. In addition, the presence of a surfactant of this class reduces surface tension without affecting viscosity, which permits uniform penetration of the inks into substrates and leads to improved color mixing. By varying the alkyl chain length of the R group, for example, between 9 and 40, surface tension, drop spread, and print density can readily be adjusted with this class of surfactants. Print density tends to decrease with increasing alkyl chain length. For example, when the chain length is 9 carbon atoms, print density is about 1.18 optical density units. At 15 to 30 carbon atoms, optical density is reduced to about 1.12, and at 40 carbon atoms, optical density is further reduced to about 1.08. Increasing chain length also tends to reduce spreading of the image. Inks containing polyoxyalkylated ether surfactants also exhibit reduced heater deposits and little or no slowing of drop speed over time. For example, in an ink composition comprising 40 percent by weight ethylene glycol, 4.5 percent by weight butyl carbitol, and 1.5 percent by weight Bernacid Red dye, drop speed will remain relatively constant for about 1,000,000 drops and subsequently will drop due to formation of deposits on the heater. An ink of the same composition to which has been added 0.5 percent by weight of Peregal 'O', however, will exhibit relatively constant drop speed for about 1,000,000 drops, after which drop speed will actually increase, probably due to the detergent or cleaning effect of the surfactant. Inks containing these surfactants, particularly the Peregal 'O', also mix well to yield mottle-free images of secondary colors.

Another class of surfactants employed for the inks of the present invention, anionic bitail fluoro thio alkyl surfactants, are characterized in that they are thought to form a bilayer structure, for instance at air-liquid interfaces. Bilayer structures are believed to be formed when the surfactant material orients itself in two layers so that one end of the molecule is oriented inwardly and the other end of the molecule is oriented outwardly.

A typical surfactant is Lodyne P200 from CibaGeigy, Ardsley, N.Y. Inks including this type of surfactant exhibit an approximately five-fold or more increase in latency as compared to inks not containing the surfactant. For example, an ink composition comprising 58 percent by weight of water, 40 percent by weight of ethylene glycol, 1.5 percent by weight of Bernacid Red dye, and 0.5 percent by weight of Lodyne P200 exhibits a latency time of over 1000 seconds under 10 percent relative humidity conditions. Under the same conditions, an ink of the same formulation but containing no Lodyne P200 exhibits a latency time of about 150 seconds. Inks containing this type of surfactant also exhibit suppressed nozzle creepage, which occurs when the ink seeps from the nozzle during nonprinting intervals, enhanced water fastness of over 80 percent, and enhanced image edge sharpness on plain paper.

A third class of surfactants that may be employed in the inks of the present invention are alkyl aryl sulfonate surfactants. A typical member of this class of surfactants is commercially available as Nekal BA77 from GAF, Wayne, N.J. Inks including a surfactant of this class exhibit rapid penetration into paper and rapid drying times on plain paper and transparency materials. These surfactants also enable inks to wet transparency stock very effectively, which prevents beading and provides high quality transparency copies. In addition, surfactants of this class are exceptional dispersing agents, and can increase the solubility of otherwise insoluble dyes such as Telon Fast Yellow 4GL/175 (Mobay Corporation, Union, N.J.), thereby enabling their use as ink jet ink dyes.

Alkyl amine quaternary salt surfactants are suitable surfactants. A typical alkyl diamine quaternary salt surfactant is commercially available as Duoquat T50 from Akzo Chemie, Chicago, Ill. Inks including a surfactant of this class exhibit enhanced water fastness of over 80 percent, reduced feathering, and migration resistance. Members of this class of surfactants tend to result in inks with relatively high surface tensions of about 40 to 43 dynes per centimeter.

Mixtures of the above surfactants may be included in the ink compositions of the present invention. Generally, each of the surfactants in the mixture is present in an amount of from about 0.5 to about 5.0 percent by weight of the ink. By combining surfactants, the advantages imparted by each surfactant may be observed in a single ink. For example, Duoquat T50, a discharged alkylamine quaternary salt surfactant, will precipitate a dye such as Bernacid Red 2BMN. When the Duoquat T50 is accompanied, however, by Nekal BA77, an alkyl aryl sulfonate surfactant, the precipitated dye is resolubilized.

A typical formulation containing a mixture of surfactants comprises a liquid medium containing 17 percent by weight ethylene glycol, 8 percent by weight Nmethyl-2-pyrrolidone, and 75 percent by weight water, to which is added 2 percent by weight Bernacid Red 2BMN dye, 2 percent by weight Duoquat T50, 2 percent by weight Nekal BA77, and 0.5 percent by weight Lodyne P200 (an anionic bitail fluoro alkyl surfactant). This ink formulation exhibits a water fastness of about 80 percent on silica paper and plain paper. Inks containing mixtures of an anionic bitail fluoro thio alkyl surfactant such as Lodyne P200 and an alkyl aryl sulfonate surfactant such s Nekal BA77 tend to exhibit reduced feathering, particularly on plain papers, such as Xerox® 4024. Inks containing mixtures of an anionic bitail fluoro thio alkyl surfactant such as Lodyne P200 and ethoxylated surfactants tend to exhibit crust free operation. The ink compositions to the present invention can be prepared by various methods, including mixing of the ingredients under ambient conditions and in the relative amounts desired in the ink.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE 1

In a bottle, are mixed 29.25 grams of deionized water, 1.01 gram of tris(hydroxymethyl) aminomethane (MW= 1.21) and 0.7 gram ethylenediaminetetraacetic acid (Versene, Dow) and the bottle is placed on a roll mill for fifteen minutes. Thereafter, an additional 54.48 grams of deionized water, 0.0992 grams polyethylene oxide/bisphenol A adduct and 0.2012 grams of Dowicil are added to the mixture and the bottle is placed on a roll mill for an additional ten minutes. 34.03 grams of glycerol, 2.008 dodecylbenzenesulfonic acid sodium salt, 30 grams of Acid Yellow 17 sodium salt and 40.02 Project Yellow 1G (7.5% Direct Yellow 132 solids) are added and the mixture is placed on the roll mill for an additional 30 minutes. Deionized water, 8.14 grams, is added to bring the total weight of ink composition to 200 grams and the ink composition is roll milled for an additional ten minutes.

Filter time of the ink composition with a 0.2 micron ink filter at 60 psi pressure is 30 minutes. The ink produces a mild bubble and the filter is clean. A portion of the ink, 10 grams, is loaded into a print cartridge and the cartridge is placed in a printer. After printing, the print cartridge is removed, decapped and set uncapped for a period of one day. No ink weep is noted. The ink provides good quality printing on a xerox thermal ink jet transparency though moderate stitching is noted.

The ink composition, method of preparing the composition and test results are summarized in Table I. In the Table, RO water is deionized water, GM is grams, PEO is polethylene oxide/bisphenol A adduct, MW is molecular weight and EDTA is ethylenediaminetetraacidic acid.

TABLE I

| INGREDIENT/DESCRIPTION | VENDOR | AMOUNT (GM) | SOL'N % | MOLE EQV |
|---|---|---|---|---|
| RO WATER | 103 | 29.25 | | NA |
| TRIS(HYDROXYMETHYL)AMINO-METHANE(TRIS, MW = 121) | ALDRICH | 1.01 | 0.5 | |
| VERSENE (EDTA, TECHNICAL GRADE) | DOW | 0.7 | 0.35 | |
| ROLL MILL 15 MINUTES, HOMOGENEOUS | NA | NA | NA | NA |
| RO WATER | 103 | 54.48 | | NA |
| PEO | POLYSCIENCE | 0.0992 | 0.05 | NA |
| DOWICIL, ROLL MILL 10 MINUTES, HOMOGENEOUS | DOW | 0.2012 | 0.1 | |
| GLYCEROL U.P.S. (GLYCERINE) | BAKER | 34.03 | 17 | |
| DODECYLBENZENESULFONIC ACID SODIUM SALT | ALDRICH | 2.008 | 1 | |
| ACID YELLOW 17 SODIUM SALT (PRODUCT CODE #6180171) | TRICON | 30 | 1.5 | |
| PROJET YELLOW 1G (7.5% DIRECT YELLOW 132 SOLIDS) | ZENECA | 40.02 | 1.5 | |
| ROLL MILL 30 MINUTES, HOMOGENEOUS WITH MODERATE FOAM | NA | NA | NA | NA |
| pH = 7.42 | NA | NA | NA | NA |
| INK WEIGHT = 191.86 GM, RO WATER TO 200 GM INK, ROLL INK 10 MIN HOMOGENEOUS, FILTER 0.2 | 103 | 8.14 | | |
| | NA | NA | NA | NA |

200 GM INK FILTER TIME 0.2 MICRON 60 PSI = 30 MINUTES, MILD BUBBLE, MILD BUBBLE, CLEAN FILTER
LOADED DJ500C PRINT CARTRIDGE WITH 10 GM INK WITH 6-KG-2 & 5-KG-5
1 DAY DECAPPED RECOVERABILITY ½₀TH OF A PAGE FOR ALL 3 COLORS.
GOOD PRINT QUALITY WITH WITHOUT FEATHERING ON XEROX IMAGE SERIES LX (HIGHLY CALENDERED ALKALINE BOND)
NO INK WEEP NOTED. GOOD PRINT QUALITY ON XEROX TIJ TRANSPARENCY THOUGH MODERATE STITCHING NOTED
FILTERED INK; ST = 28.9, VISCOSITY = 1.87, pH = 7.19, COND = 5.0

EXAMPLES II–IV

Ink compositions are prepared according to the descriptions in the following Table II–IV. The compositions are tested for filter time, dry time, decap recoverability and transparency coverage with the results as summarized after each Table. In the Tables II–IV, the abbreviations are the same as in Table I.

TABLE II

| INGREDIENT/DESCRIPTION | VENDOR | AMOUNT (GM) | SOL'N % | MOLE EQV |
|---|---|---|---|---|
| RO WATER | 103 | 29.91 | | NA |
| TRIS(HYDROXYMETHYL)AMINO-METHANE(TRIS, MW = 121) | ALDRICH | 1.02 | 0.5 | |
| VERSENE (EDTA, TECHNICAL GRADE) | DOW | 0.71 | 0.35 | |
| ROLL MILL 15 MINUTES, HOMOGENEOUS | NA | NA | NA | NA |
| RO WATER | 103 | 64.19 | | NA |
| PEO | POLYSCIENCE | 0.1004 | 0.05 | NA |
| DOWICIL, ROLL MILL 10 MINUTES, HOMOGENEOUS | DOW | 0.1998 | 0.1 | |
| GLYCEROL U.P.S. (GLYCERINE) | BAKER | 29.07 | 14.5 | |
| DODECYLBENZENESULFONIC ACID SODIUM SALT | ALDRICH | 1.99 | 1 | |
| PROJET MAGENTA 1T (10% REACTIVE RED DYE SOLIDS, PROD CODE #23934) | ZENECA | 50 | 2.5 | |
| ACID RED 52 SODIUM SALT (10.3% DYE SOLIDS) | TRICON | 11.42 | 0.6 | |
| ROLL MILL 30 MINUTES, HOMOGENEOUS WITH MODERATE FOAM | NA | NA | NA | NA |
| pH = 7.67, EDTA, pH = 7.34 | DOW | 0.04 | 0.01 | NA |
| INK WEIGHT = 189.02 GM, RO WATER TO 200 GM INK, ROLL MILL 10 MIN HOMOGENEOUS, FILTER 0.2 | 103 | 10.98 | | |
| | NA | NA | NA | NA |

200 GM INK FILTER TIME 0.2 MICRON 60 PSI = 120 SECONDS, MILD BUBBLE, CLEAN FILTER
LOADED DJ500C PRINT CARTRIDGE WITH 10 GM INK WITH 6-KG-1 & 5-KG-5
1 DAY DECAPPED RECOVERABILITY ½₀TH OF A PAGE FOR ALL 3 COLORS.

TABLE II-continued

| INGREDIENT/DESCRIPTION | VENDOR | AMOUNT (GM) | SOL'N % | MOLE EQV |
|---|---|---|---|---|
| GOOD PRINT QUALITY WITH WITHOUT FEATHERING ON XEROX IMAGE SERIES LX (HIGHLY CALENDERED ALKALINE BOND) | | | | |
| NO INK WEEP NOTED. GOOD PRINT QUALITY ON XEROX TIJ TRANSPARENCY THOUGH MODERATE STITCHING NOTED | | | | |
| FILTERED INK; ST = 28.9, VISCOSITY = 1.74, pH = 7.28, COND = 5.70 | | | | |

TABLE III

| INGREDIENT/DESCRIPTION | VENDOR | AMOUNT (GM) | SOL'N % | MOLE EQV |
|---|---|---|---|---|
| RO WATER | 103 | 29.63 | | NA |
| TRIS(HYDROXYMETHYL)AMINO-METHANE(TRIS, MW = 121) | ALDRICH | 1.02 | 0.5 | |
| VERSENE (EDTA, TECHNICAL GRADE) | DOW | 1.02 | 0.5 | |
| ROLL MILL 15 MINUTES, HOMOGENEOUS | NA | NA | NA | NA |
| RO WATER | 103 | 97.12 | | NA |
| PEO | POLYSCIENCE | 0.0991 | 0.05 | NA |
| DOWICIL, ROLL MILL 10 MINUTES, HOMOGENEOUS | DOW | 0.1996 | 0.1 | |
| GLYCEROL U.P.S. (GLYCERINE) | BAKER | 20.03 | 10 | |
| DODECYLBENZENESULFONIC ACID SODIUM SALT | ALDRICH | 2.01 | 1 | |
| BASACID X-34 (30% DYE SOLIDS) | BASF | 33.52 | 16.75 | |
| ACID RED 52 SODIUM SALT (10.5% DYE SOLIDS) | TRICON | 5.7 | 2.85 | |
| ROLL MILL 30 MINUTES, HOMOGENEOUS WITH MODERATE FOAM | NA | NA | NA | NA |
| pH = 7.27 | NA | NA | NA | NA |
| INK WEIGHT = 190.83 GM, RO WATER TO 200 GM INK, ROLL MILL 10 MIN | 103 | 9.17 | | |
| HOMOGENEOUS, FILTER 0.2 | NA | NA | NA | NA |

200 GM INK FILTER TIME 0.2 MICRON 60 PSI = 80 SECONDS, MILD BUBBLE, CLEAN FILTER
FILTERED INK; ST = 29.4, VISCOSITY = 1.80, pH = 7.20, COND = 7.50

TABLE IV

| INGREDIENT/DESCRIPTION | VENDOR | AMOUNT (GM) | SOL'N % | MOLE EQV |
|---|---|---|---|---|
| RO WATER | 103 | 124.94 | | NA |
| PEO | POLYSCIENCE | 0.0996 | 0.5 | NA |
| DOWICIL, ROLL MILL 10 MINUTES, HOMOGENEOUS | DOW | 0.2004 | 0.1 | |
| GLYCEROL U.P.S. (GLYCERINE) | BAKER | 33.99 | 17 | |
| CALSOFT T-60 (TRIETHANOL AMMONIUM DBS, 60%, VISCOUS YELLOW LIQUID) | PILOT CHEM CO | 1.99 | 1 | NA |
| PROJET CYAN 1 LIQUID (10% DB199 DYE SOLIDS) | ZENECA | 30.11 | 1.5 | |
| DUASYN ACID BLUE AE-SF VP344 (AB9) | HOESCHT | 3.01 | 1.5 | |
| ROLL MILL 30 MINUTES, HOMOGENEOUS WITH MODERATE FOAM | NA | NA | NA | NA |
| pH = 6.40, TRIS, pH = 7.30 | ALDRICH | 0.08 | 0.04 | |
| INK WEIGHT = 194.10 GM, RO WATER TO 200 GM INK, ROLL MILL 10 MIN | 103 | 5.9 | | |
| HOMOGENEOUS, FILTER 0.2 | NA | NA | NA | NA |

200 GM INK FILTER TIME 0.2 MICRON 60 PSI = 115 SECONDS, MILD BUBBLE, CLEAN FILTER
FILTERED INK; ST = 33.8, VISCOSITY = 1.87, pH = 7.16, COND = 2.90

The yellow colorant package shows a warm yellow vibrancy and hue and provides improved light fastness and water fastness relative to Acid Yellow 17 alone. The cyan color package of Direct Blue 199 and Acid Blue 9 mimics the optical density and hue of an ink with Acid Blue 9 alone but shows superior light fastness. The black dye package is a pleasing black ink when printed on plain office papers. The ink shows improved black chroma over black dyes of Basacid X34-34 or Special Black XF as the sole colorant.

The present invention also relates to a set of ink jet inks comprising the described colorant packages.

While the invention has been described with reference to preferred embodiments, the invention is not limited to the specific examples given, and other embodiments and modifications can be made by those skilled in the art without departing from the spirit and scope of the invention and claims.

What is claimed is:

1. An ink jet composition, comprising (a) a liquid medium and (b) a colorant package comprising a reactive dye and a direct dye.

2. An ink jet composition, comprising 99.8 to 92.5 wt. % liquid medium, 0.1 to 3.5 wt. % Acid Yellow 17 and 0.1 to 4 wt. % Direct Yellow 132.

3. An ink jet composition, comprising (a) a liquid medium and (b) a colorant package comprising a black dye and Direct Red 227 Na salt or Acid Red 52 dye solids.

4. A set of ink jet inks, comprising a yellow ink containing a yellow dye package, a magenta ink containing a magenta dye package and a cyan ink containing a cyan dye package, at least one said dye package comprising (i) an acid dye or reactive dye and (ii) a direct dye.

5. The ink jet set of claim 4, wherein the yellow dye package comprises Acid Yellow 17 and Direct Yellow 132.

6. The ink jet set of claim 4, wherein the cyan dye package comprises Direct Blue 199 and Acid Blue 9.

7. The ink jet set of claim 4, wherein the magenta dye package comprises Project a reactive red dye and Acid Red 52.

8. The ink jet set of claim 4, wherein the yellow ink comprises 99.8 to 92.5 liquid medium, 0.1 to 3.5 wt. % Acid Yellow 17 and 0.1 to 4 wt. % Direct Yellow 132; the cyan ink comprises 99.8 to 92.5 wt. % liquid medium, 0.1 to 3.5 wt. % Acid Blue 9 and 0.1 to 4 wt. % Direct Blue 199; and the magenta ink comprises 99.8 to 93.5 wt. % liquid medium, 0.1 to 3.5 wt. % Project a reactive red dye and 0.1 to 3 wt. % Acid Red 52.

9. The ink jet set of claim 4, additionally comprising a dye package comprising 1.0 to 6.0 wt. % of a a black dye, 0.1 to 1.0 wt. % of a member selected from the group consisting of Direct Red 227 Na salt and Acid Red 52 dye solids and 99.8 to 93.0 wt. % liquid medium.

10. A process of ink jet printing, comprising causing an ink jet composition of claim 1 to be ejected in an imagewise fashion from an ink jet printer onto a substrate.

11. A process of ink jet printing, comprising causing an ink jet composition of claim 2 to be ejected in an imagewise fashion from an ink jet printer onto a substrate.

12. A process of ink jet printing, comprising causing an ink jet composition of claim 3 to be ejected in an imagewise fashion from an ink jet printer onto a substrate.

13. A method of producing an ink jet ink composition, comprising forming a mixture of (a) a liquid medium and (b) a colorant package comprising (i) an acid dye and a direct dye or (ii) a reactive dye and a direct dye, and adjusting proportions of said dyes to match vibrancy or hue of natural or artificial color.

14. The method of claim 13, wherein the colorant package (b) comprises Acid Yellow 17 and Direct Yellow 132.

15. The method of claim 13, comprising forming a mixture of 99.8 to 92.5 wt. % liquid medium and adjusting proportions of acid dye to direct dye to 0.1 to 3.5 wt. % Acid Yellow 17 and 0.1 to 4 wt. % Direct Yellow 132.

16. The method of claim 13, wherein the colorant package (b) comprises Acid Blue 9 and Direct Blue 199.

17. The method of claim 13, comprising forming a mixture of 99.8 to 92.5 wt. % liquid medium and adjusting proportions of acid dye to direct dye to 0.1 to 3.5 wt. % Acid Blue 9 and 0.1 to 4 wt. % Direct Blue 199.

* * * * *